US012520824B1

(12) United States Patent
Edmonds et al.

(10) Patent No.: US 12,520,824 B1
(45) Date of Patent: Jan. 13, 2026

(54) ANIMAL TRAINING APPARATUS

(71) Applicant: Edmonds Outdoors, LLC, La Vergne, TN (US)

(72) Inventors: Addison Edmonds, Nashville, TN (US); Colton Gray Breeding, Nashville, TN (US); Gene Andrew Sparks, Nashville, TN (US)

(73) Assignee: Edmonds Outdoors, LLC, La Vergne, TN (US)

( * ) Notice: Subject to any disclaimer, the term of this patent is extended or adjusted under 35 U.S.C. 154(b) by 0 days.

(21) Appl. No.: 18/910,531

(22) Filed: Oct. 9, 2024

(51) Int. Cl.
*A01K 15/02* (2006.01)

(52) U.S. Cl.
CPC ................... *A01K 15/02* (2013.01)

(58) Field of Classification Search
CPC .... A01K 15/02; A01K 15/025; A01K 15/021; G01K 3/00; A63H 5/00
See application file for complete search history.

(56) References Cited

U.S. PATENT DOCUMENTS

| | | | |
|---|---|---|---|
| 3,902,272 A * | 9/1975 | Molenaar | A63H 5/00 446/415 |
| 11,457,610 B1 * | 10/2022 | Johnson | A01K 15/02 |
| 11,968,960 B1 * | 4/2024 | Yang | A01K 15/025 |
| 2006/0180092 A1 * | 8/2006 | Reiter | A01K 15/02 119/712 |
| 2007/0074668 A1 * | 4/2007 | Zutis | A01K 5/0114 119/51.01 |
| 2012/0216372 A1 * | 8/2012 | Leggett | A01K 15/02 24/3.1 |
| 2013/0233246 A1 * | 9/2013 | Wang | A01K 15/025 119/51.01 |
| 2023/0123107 A1 * | 4/2023 | DiGrado | A01K 15/02 119/707 |
| 2025/0185627 A1 * | 6/2025 | Chang | A01K 15/02 |

FOREIGN PATENT DOCUMENTS

| | | | | |
|---|---|---|---|---|
| GB | 2396477 A | * | 6/2004 | G10K 3/00 |
| GB | 2408378 A | * | 5/2005 | G10K 3/00 |

* cited by examiner

*Primary Examiner* — Trinh T Nguyen
(74) *Attorney, Agent, or Firm* — Holland & Knight LLP; Matthew C. Cox; Forrest S. Tinnin

(57) ABSTRACT

An animal training apparatus is provided. The apparatus may include a first panel and a second panel. The second panel may be pivotally connected to the first panel, forming a hinge. The first panel may include a bar extending towards the second panel. The apparatus may further include a plate. The plate may include a fixed end disposed on the second panel, and a free end extending towards the first panel and the hinge. When the first panel is pivoted towards the second panel, the free end of the plate may make contact with the bar, such that the plate is bent (e.g., a bend is formed on the plate). When the bend on the plate is formed, the plate may emit an audible sound. In some embodiments, the bar is wider than the plate. In further embodiments, the apparatus further includes a loop disposed on the hinge.

13 Claims, 20 Drawing Sheets

ANIMAL TRAINING APPARATUS

CROSS-REFERENCES TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING OR COMPUTER PROGRAM LISTING INDEX

Not applicable.

BACKGROUND

The present invention relates generally to animal training devices and methods. More particularly, the present relates to noise emitting devices for animal training.

Some techniques of animal training involve auditory conditioning. For instance, when an animal is being trained to perform a task or maneuver, a short sound (such as a "beep" or a "click") may be emitted by the trainer when giving the command. Typically, a treat or other positive reinforcement is provided upon the animal's completion of said task or maneuver. Over time, as the sound is provided in conjunction with the treat or other positive reinforcement, the animal may associate the sound with an impetus to obey the trainer's command to perform the task or maneuver. Thus, over time, the animal may be trained to respond to the sound (without necessarily providing the treat) by completing the requested task or maneuver.

Conventional systems for emitting such auditory conditioning systems typically include a handheld device configured to emit a short sound, such as a "click" or a "beep." Some systems offer an electronic approach. However, such systems face a disadvantage of requiring an electric power supply, such as a battery that must be replaced or recharged. Other systems offer a mechanical approach. However, such systems face a disadvantage of providing a limited acoustic quality of sound, being cumbersome to hold in the trainer's hand or pocket, mechanical wear-and-tear, and so on. It would be advantageous to provide an enhanced mechanical system for emitting auditory conditioning for the purpose of animal training that addresses these and other problems present in the prior art.

What is needed, therefore, are improved devices and methods for the auditory training of animals.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is an animal training apparatus. The apparatus may include a first panel and a second panel. The second panel may be pivotally connected to the first panel, forming a hinge. The first panel may include a bar extending towards the second panel. The apparatus may further include a plate. The plate may include a fixed end disposed on the second panel, and a free end extending towards the first panel and the hinge. When the first panel is pivoted towards the second panel, the free end of the plate may make contact with the bar, such that the plate is bent (e.g., a bend is formed on the plate). When the bend on the plate is formed, the plate may emit an audible sound. In some embodiments, the bar is wider than the plate. In further embodiments, the apparatus further includes a loop disposed on the hinge.

In some embodiments, the plate includes a dimple positioned in between the fixed end and the free end. For example, when the plate is being bent, the dimple may be flexed, such that the dimple emits an audible sound. In some embodiments, the dimple extends towards the first panel prior to being flexed. In other embodiments, the dimple extends towards the second panel prior to being flexed.

In some embodiments, the first panel includes one or more slots extending through the first panel. In further embodiments, a cross-wise through-hole is formed between the bar and the hinge.

In some embodiments, the second panel includes a ramp extending towards the first panel between a base of the ramp and a tip of the ramp. The ramp may include a base and a pair of arms extending from the base along outer edges of the ramp and towards the hinge. The plate may be disposed on the base and the pair of arms, such that a recess is formed between the plate and the second panel, and between the pair of arms. In some embodiments, the aforementioned bend formed on the plate may be positioned in between the tip of the ramp and the bar. In further embodiments where the plate includes the dimple, the dimple may be positioned over the tip of the ramp.

Another aspect of the present disclosure is a method of emitting an animal training noise. The method may include providing the aforementioned first panel, the second panel, and the plate. The method may further include pivoting the first panel towards the second panel, such that the free end of the plate makes contact with the bar and the plate is bent. As discussed above, when the plate is bent, the plate may emit an audible sound.

Numerous other objects, advantages and features of the present disclosure will be readily apparent to those of skill in the art upon a review of the following drawings and description of a preferred embodiment.

DETAILED DESCRIPTION

Figure 1:
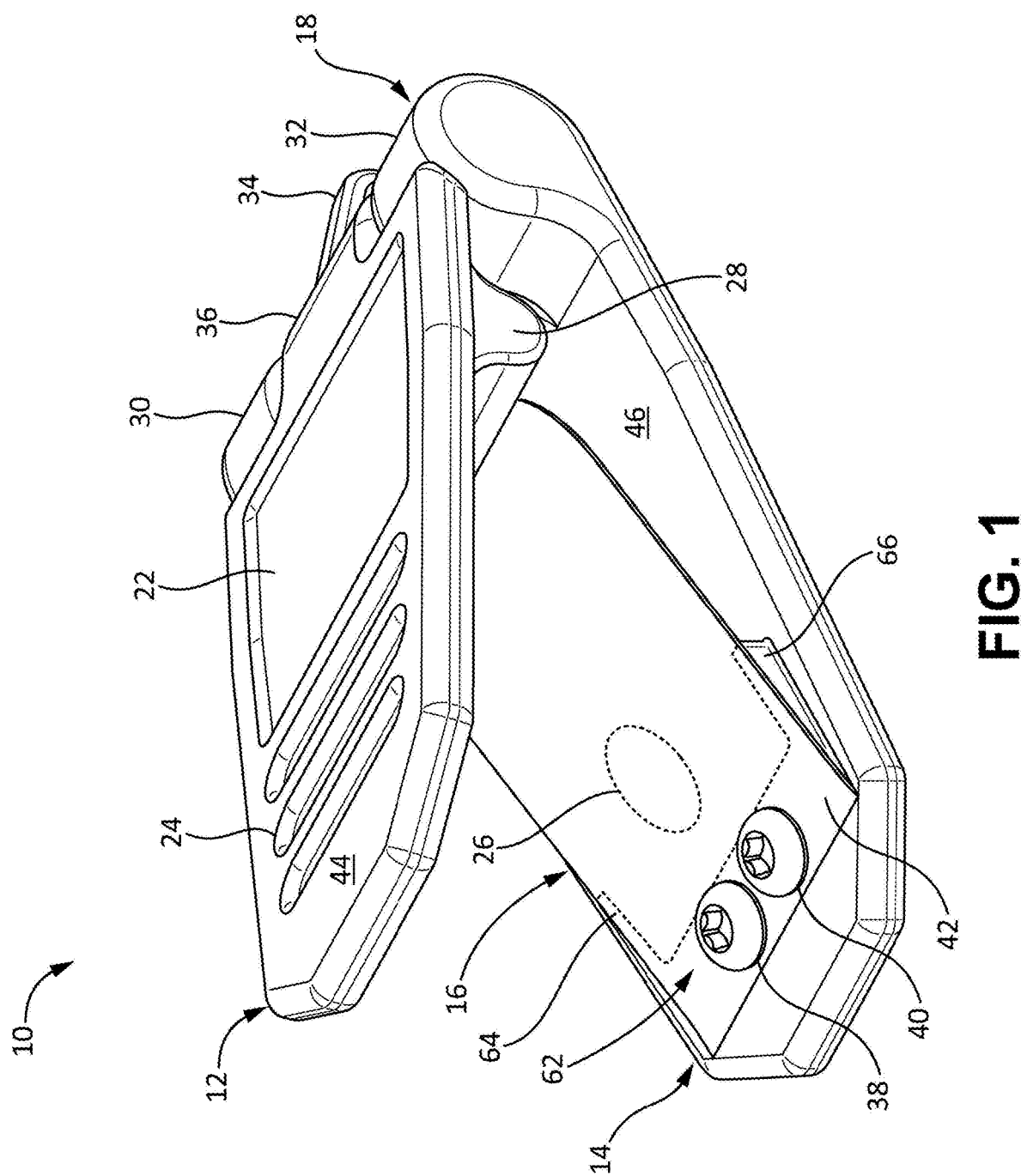
FIG. 1 is an upper perspective schematic view of an animal training apparatus, according to some embodiments of the present disclosure.
Figure 2:
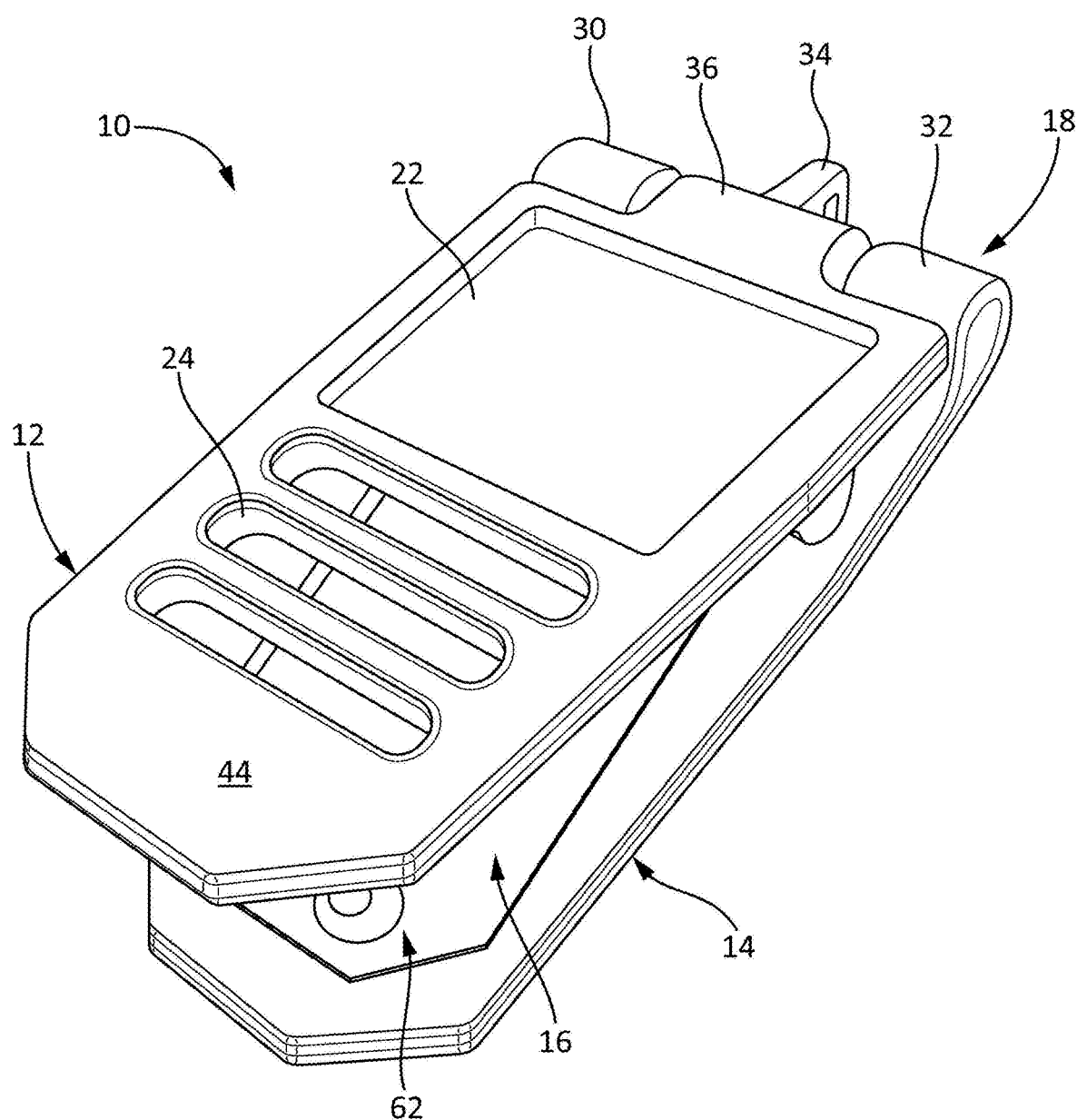
FIG. 2 is an upper perspective view of an exemplary implementation of an animal training apparatus, according to some embodiments of the present disclosure.
Figure 3:
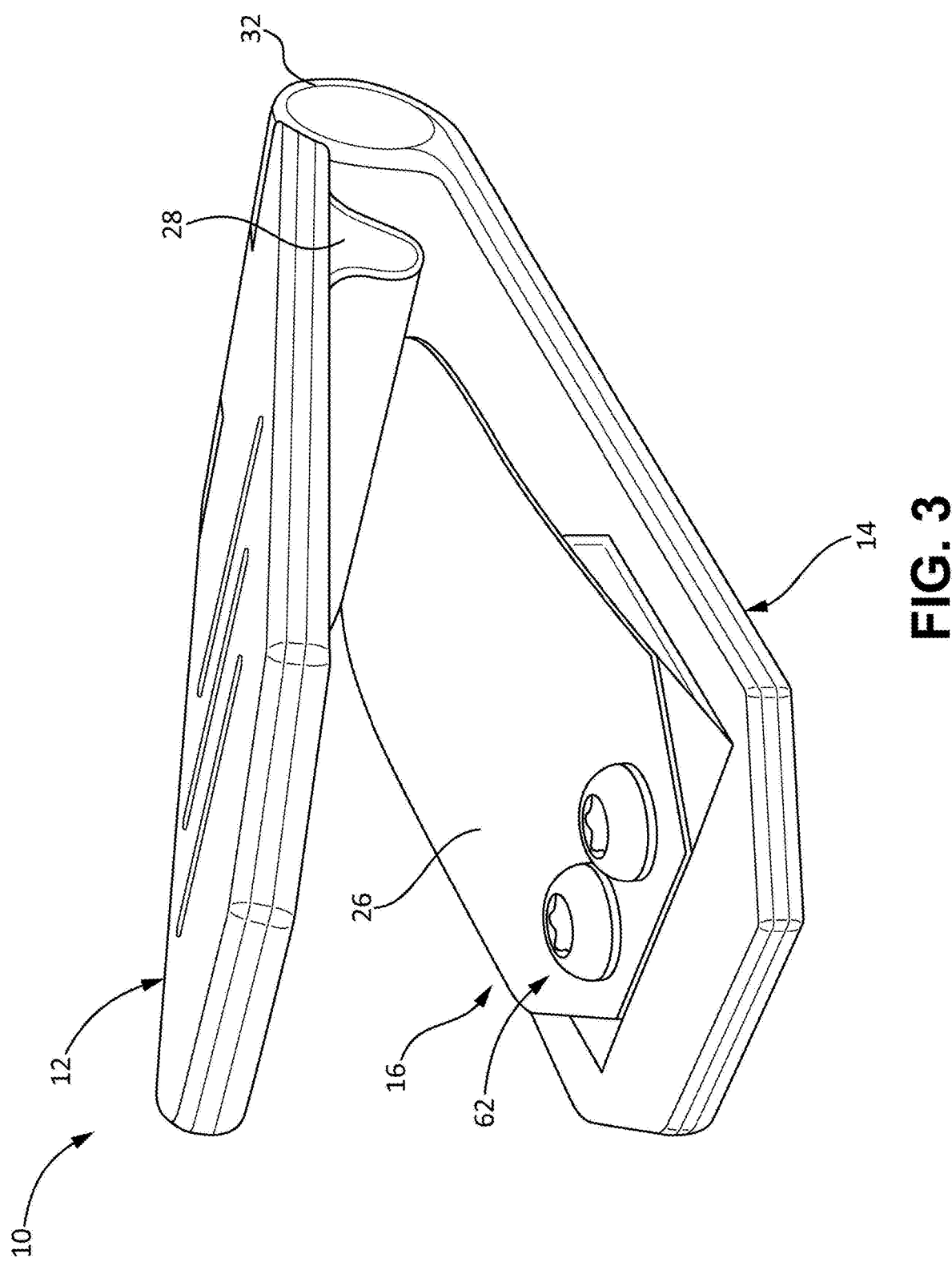
FIG. 3 is a front-right perspective view of an exemplary implementation of an animal training apparatus, according to some embodiments of the present disclosure.
Figure 4:
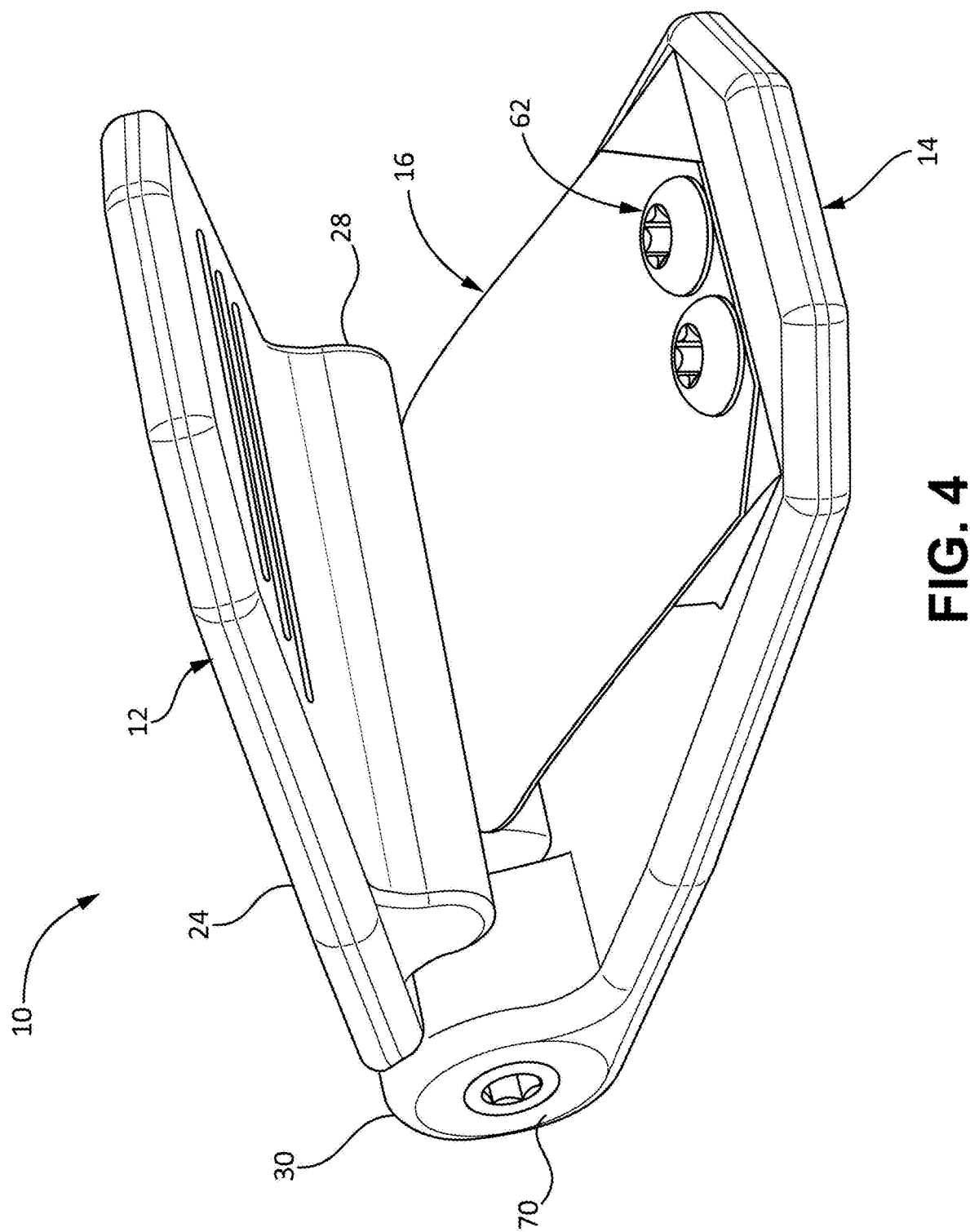
FIG. 4 is a front-left perspective view of an exemplary implementation of an animal training apparatus, according to some embodiments of the present disclosure.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The words "connected", "attached", "joined", "mounted", "fastened", "secured," and the like should be interpreted to mean any manner of joining two objects including, but not limited to, the use of any fasteners such as screws, nuts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Referring to FIGS. 1-4, an animal training apparatus (apparatus) 10 is shown, according to various embodiments of the present disclosure. The apparatus 10 may include a first panel 12 and a second panel 14. The second panel 14 may be pivotally connected to the first panel 12, forming a hinge 18. The first panel 12 may include an outer (e.g., upper) face 44 facing away from the second panel 14, and as shown with reference to FIGS. 12 and 13, the first panel 12 may further include an inner (e.g., lower) face 48 facing the second panel 14. Similarly, the second panel 46 may include an inner (e.g., upper) face 46 facing towards the first panel 12, and an outer (e.g., lower) face, facing away from the first panel 12. Generally, the first and second panels 12, 14 may be flat, elongate members sized to fit within the hand of a user. The first an second panels 12, 14 may be made of any suitable material, including but not limited to plastic, fiber-glass, rubber, and so on.

In some embodiments, the first panel 12 includes a bar 28 extending towards the second panel 14. For example, the bar 28 may be disposed on inner face 48 of the first panel 12, and form an elongate protrusion extending cross-wise along the inner face 48 of the first panel 12. Generally, the bar 28 may be positioned (lengthwise) towards the hinge 18. As discussed herein, the bar 28 and the remaining features of the first panel 12 are integrally formed as a single component (e.g., through a molding process). In further embodiments, however, the bar 28 is a separate component that may be attached to the first panel 12, and may be replaced from time to time.

In some embodiments, the apparatus 10 further includes a plate 16. With additional reference to FIGS. 5, 8, and 12, the plate 16 may include a fixed end 90 disposed on the second panel 14, and a free end 92 extending towards the first panel 12 and the hinge 18. In some embodiments, the bar 28 is wider than the plate 16. Generally, the plate 16 may be a flat, elongate member with a similar profile to that of the first and second panels 12, 14 at one end, but may be sized appropriately to fit within the perimeters of the first and second panels 12, 14 as generally depicted herein. The free end 92 of the plate 16 may form a rounded distal edge of the plate 16. As discussed herein, the plate 16 may be configured to be bent until such flexure results in an auditory clicking sound, and return to its original shape. Accordingly, the plate 16 may be constructed of any suitable material, including but not limited to composite, polymer, aluminum, stainless steel, or other suitable metals or metal alloys.

Figure 5:
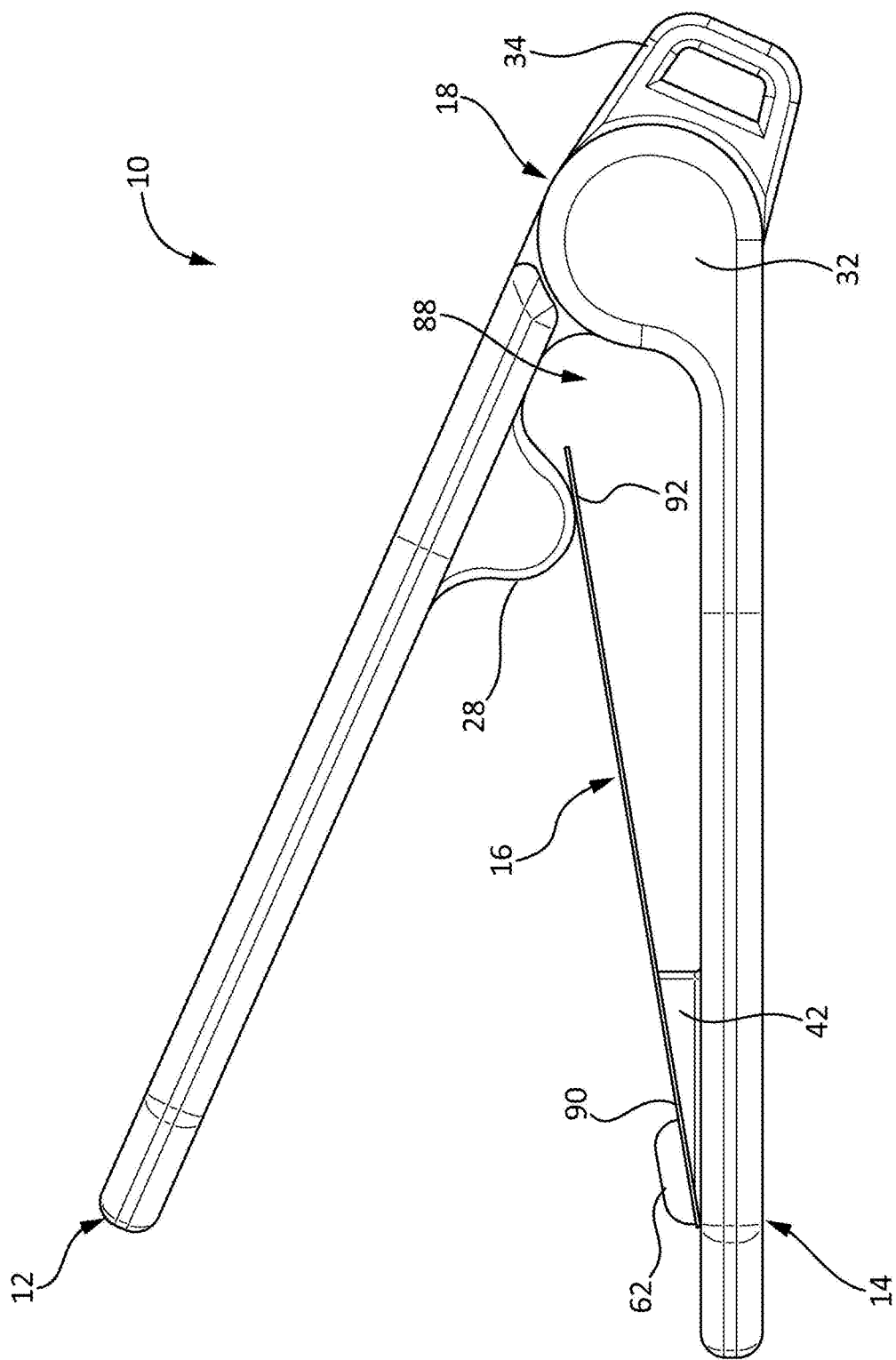
FIG. 5 is a side schematic view of an animal training apparatus, according to some embodiments of the present disclosure.
Figure 6:
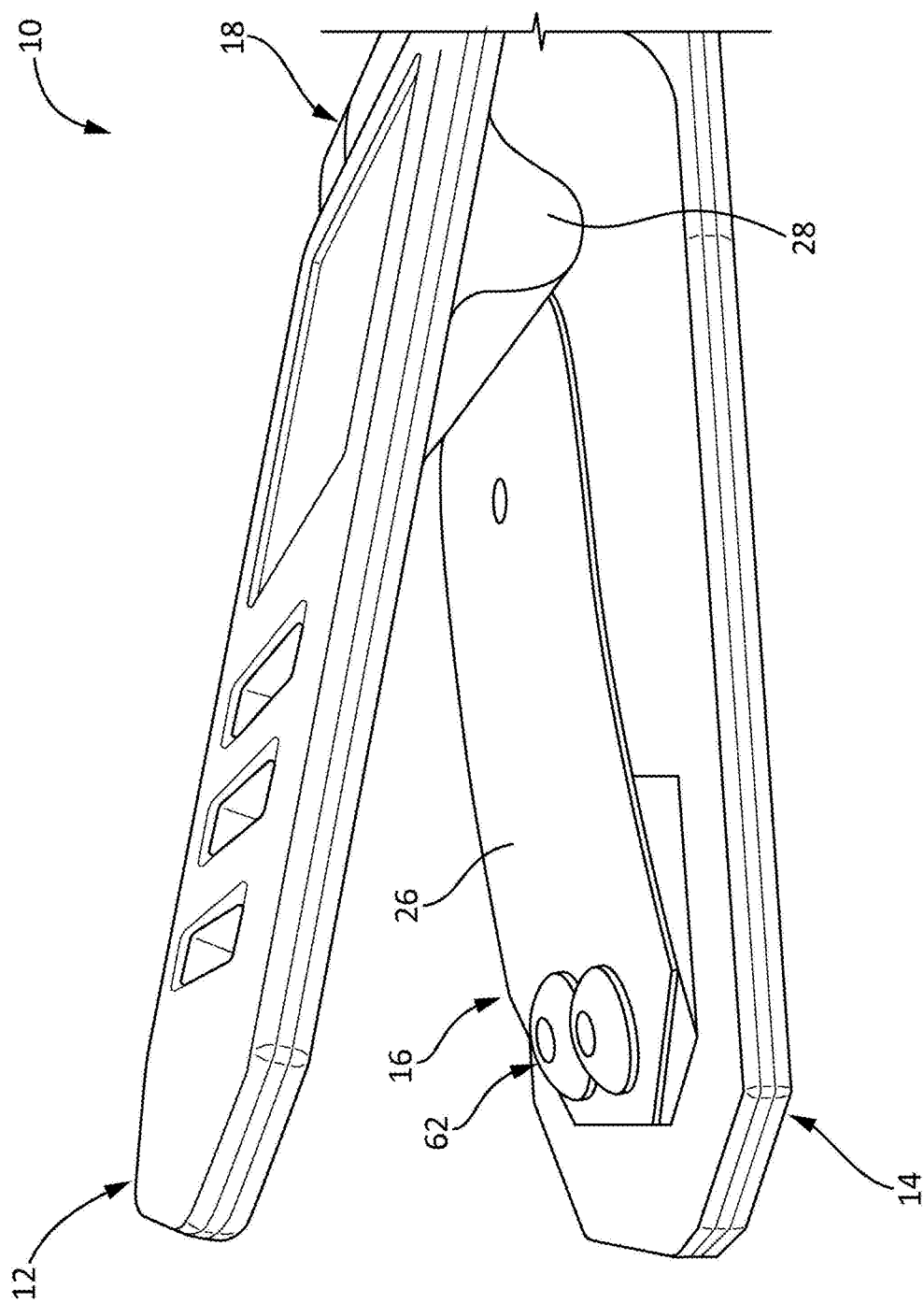
FIG. 6 is a side view of an exemplary implementation of an animal training apparatus, according to some embodiments of the present disclosure.
Figure 7:
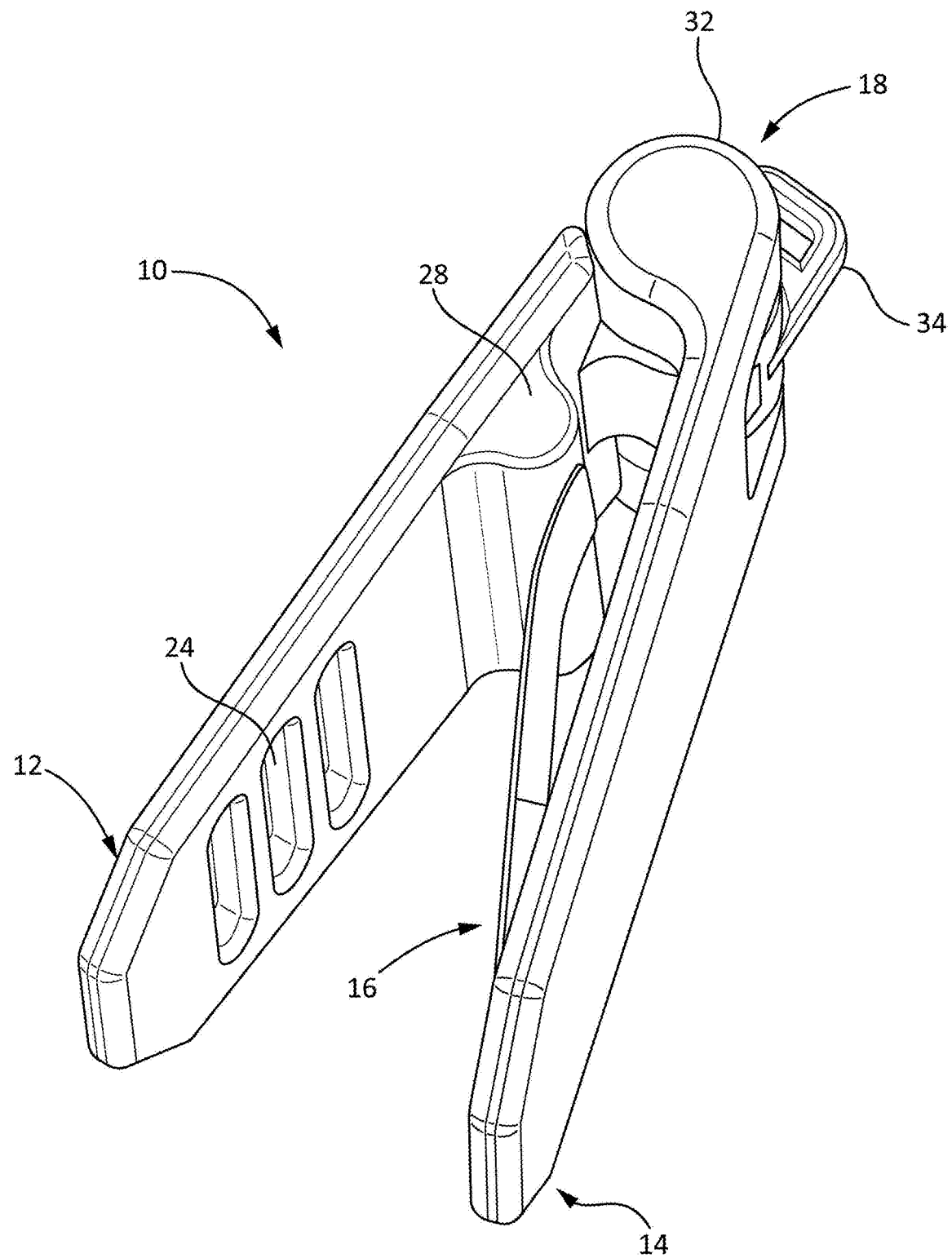
FIG. 7 is a side perspective view of an exemplary implementation of an animal training apparatus, according to some embodiments of the present disclosure.
Figure 8:
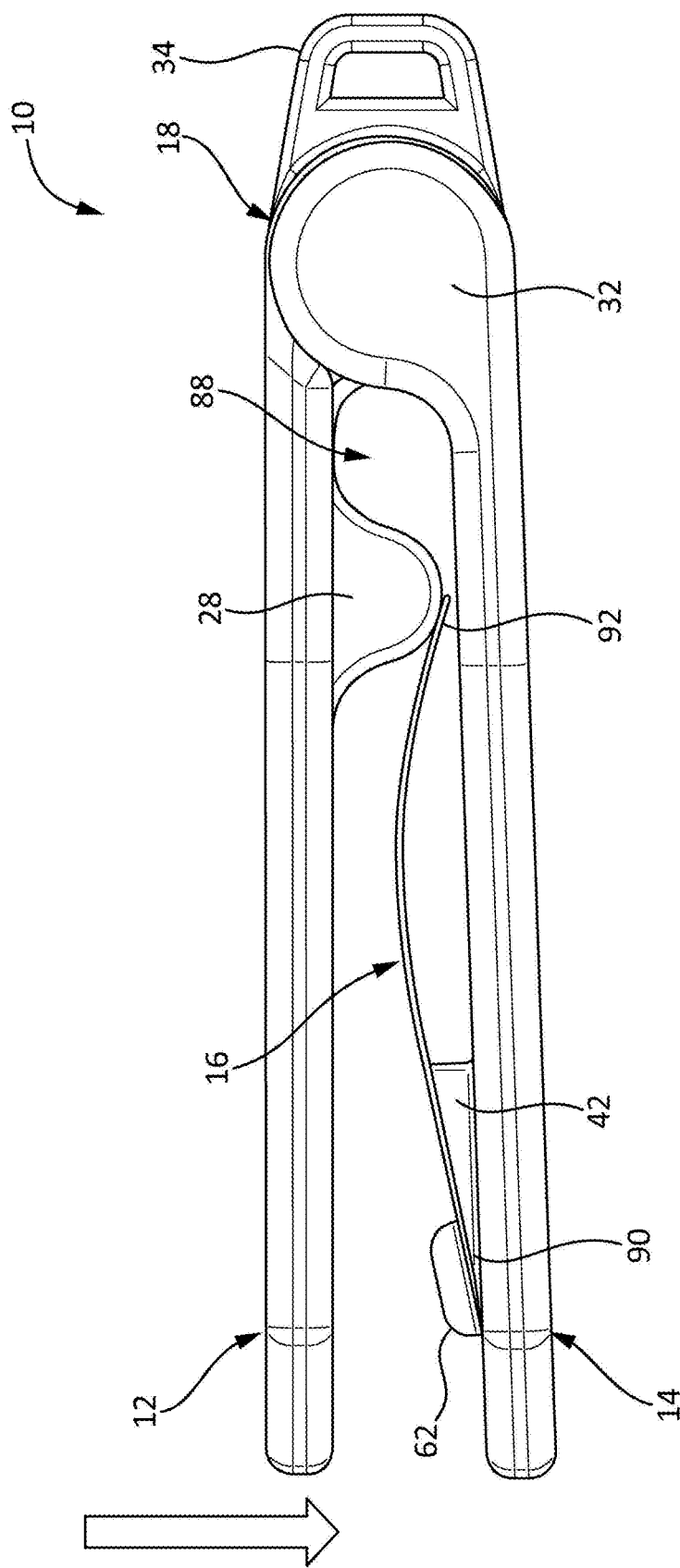
FIG. 8 is a side schematic view of an animal training apparatus being compressed, according to some embodiments of the present disclosure.
Figure 9:
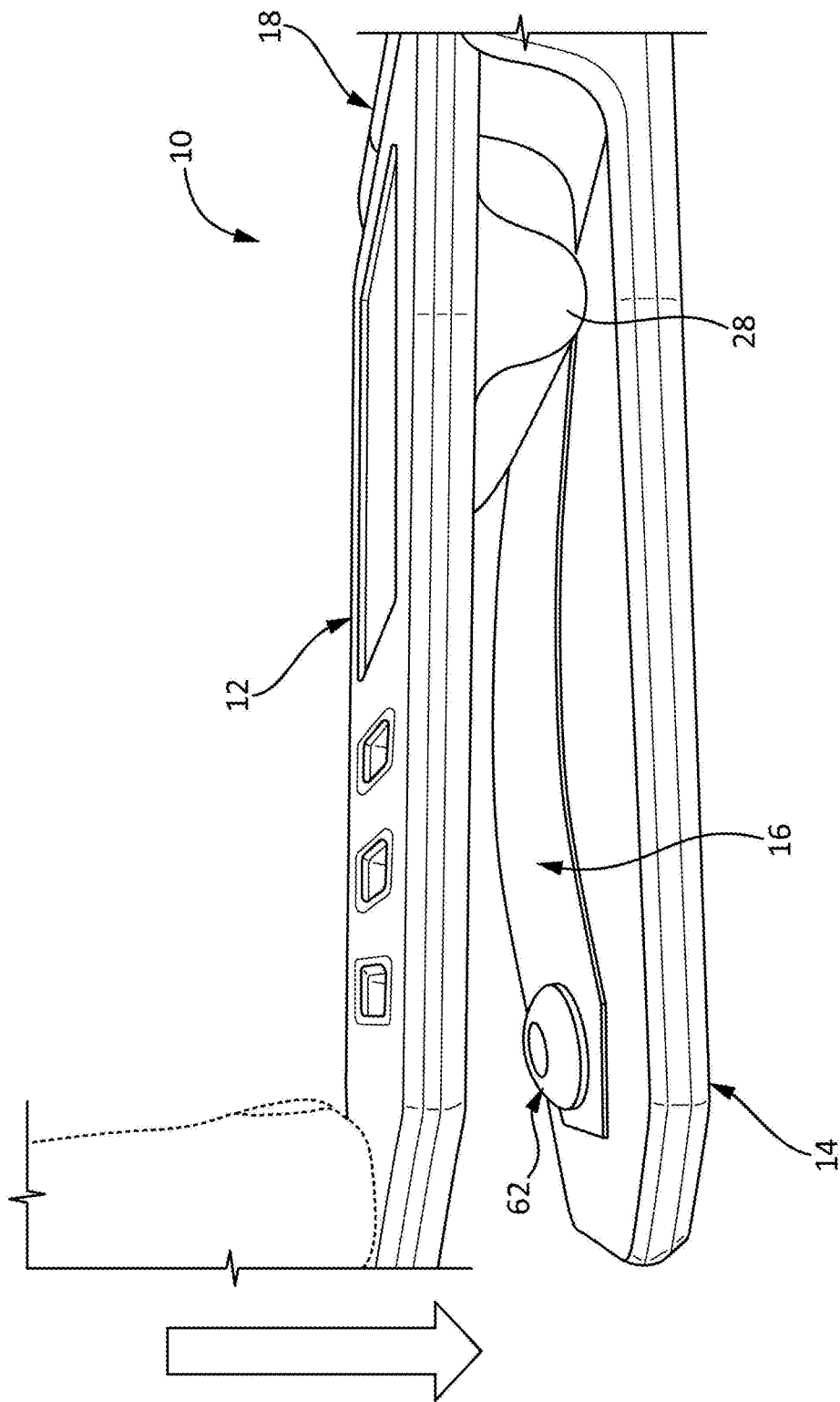
FIG. 9 is a side view of an exemplary implementation of an animal training apparatus being compressed, according to some embodiments of the present disclosure.

Referring to FIGS. 5-9, the apparatus 10 is shown being operated to form a bend in the plate 16, according to some embodiments of the present disclosure. For instance, FIG. 5-7 depict the apparatus 10 in an open configuration (e.g., where the first panel 12 is fully pivoted away from the second panel 14), while FIGS. 8 and 9 depict the apparatus 10 in a closed configuration (e.g., where the first panel has been fully pivoted towards the second panel 14). When the first panel 12 is pivoted towards the second panel 14, the free end 92 of the plate may make contact with the bar 28, such that the plate 16 is bent (e.g., a bend is formed on the plate), as shown with reference to FIGS. 8 and 9. When the bend on the plate 16 is formed, the plate 16 may emit an audible sound (e.g., a "click" sound, a "pop" sound, etc.). Of course, as discussed in greater detail below with reference to FIGS. 10-11, various features on the plate 16 may be present in order for the plate 16 to emit such sound. Accordingly, such sound may be emitted by the plate 16 in response to a various range of degrees of bending imparted upon the plate 16. In other words, while FIGS. 8 and 9 depict the apparatus 10 in the "closed" configuration associated with providing the auditory sound, it should be appreciated that the plate 16 may be configured to provide the sound in response to less bending, more bending, and so on.

In some embodiments, the apparatus 10 includes a loop 34 disposed on the hinge 18. The loop 34 may be used to secure the apparatus 10 to a lanyard, a set of keys, other animal training devices, etc.

In some embodiments, a cross-wise through-hole 88 is formed between the bar 28 and the hinge 18. For example, components of the apparatus 10 (e.g., the first and second panels 12, 14, the plate 16, etc.) may be arranged such that, when the plate 16 is bent to a point at which the plate 16 emits the aforementioned auditory sound, the through-hole 88 is maintained adjacent to the bar 28 and the free end 92 of the plate 16. Advantageously, the through-hole 88 may facilitate an enhanced amount of sound being allowed to travel outwards from between the first and second panels 12, 14 upon the emission of the auditory sound.

Figure 10:
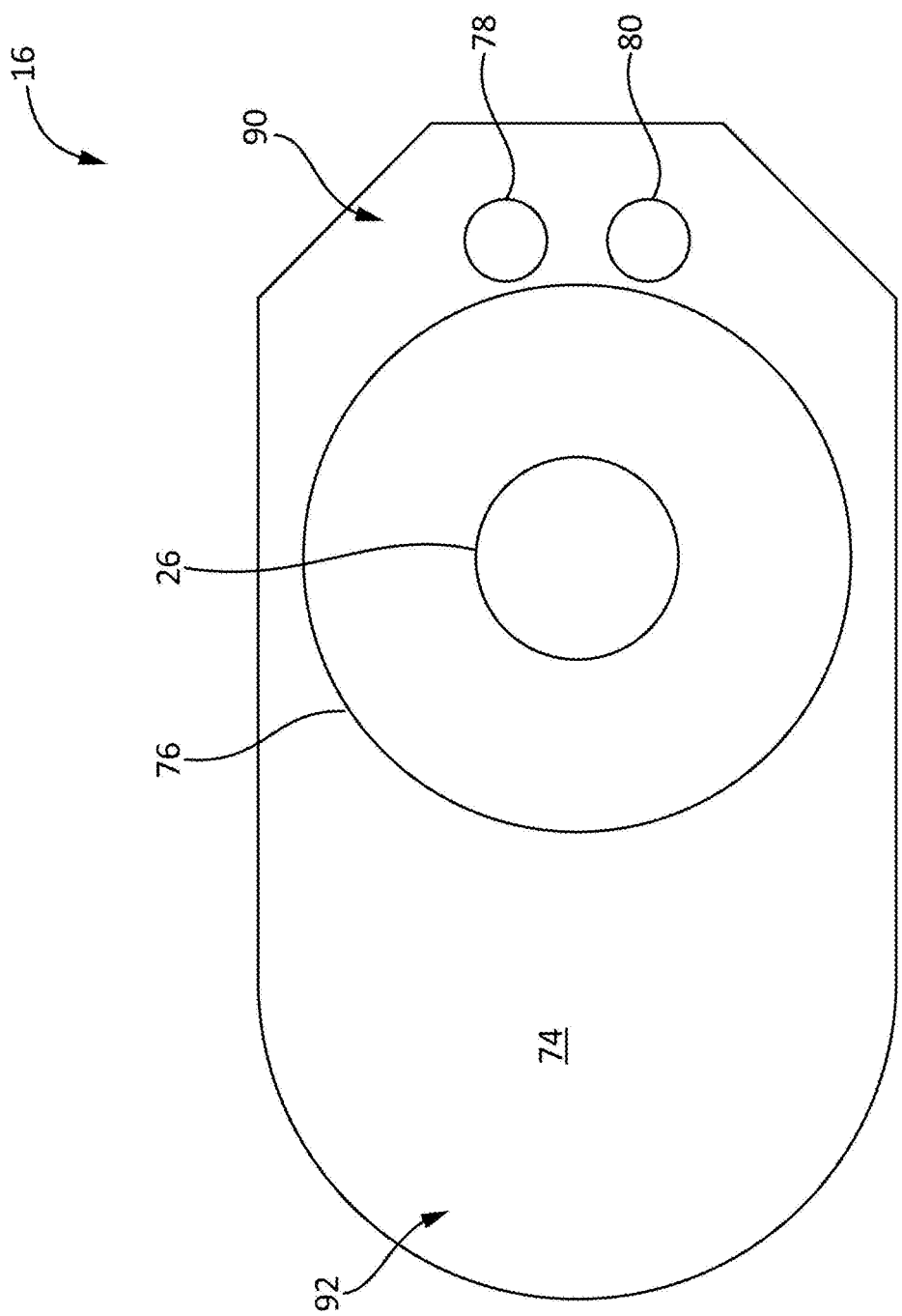
FIG. 10 is a top schematic view of a plate for an animal training apparatus, according to some embodiments of the present disclosure.
Figure 11:
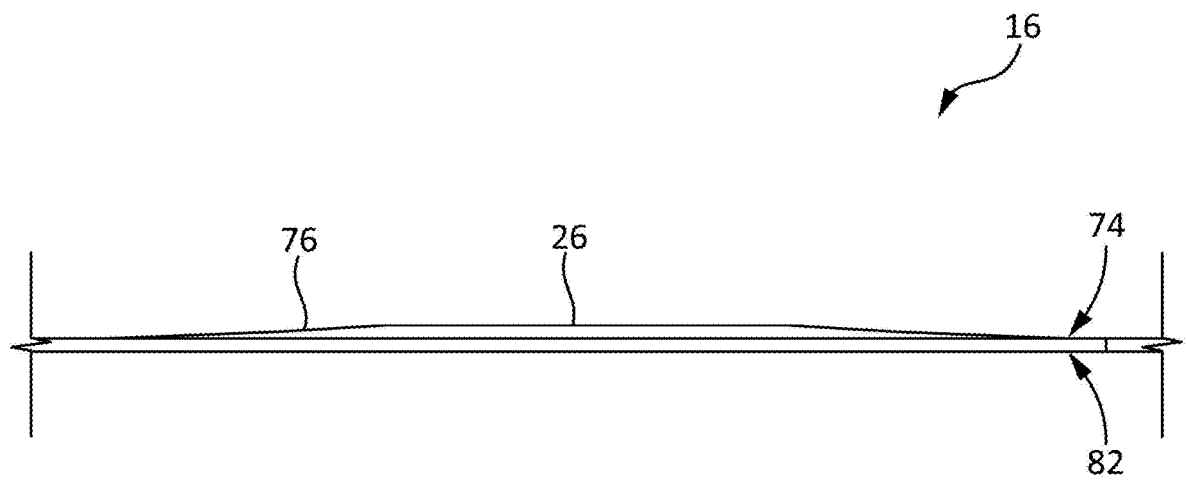
FIG. 11 is a side schematic view of a plate for an animal training apparatus, according to some embodiments of the present disclosure.

Referring now to FIGS. 10 and 11, the plate 16 is shown in greater detail, according to various embodiments of the present disclosure. In some embodiments, the plate 16 includes a dimple 26 positioned in between the fixed and free ends 90, 92 of the plate 16. Depending on the implementation, the dimple 26 may be a slightly protruding face formed by a ramped surface 76 of the plate 16, which may extend radially from the border of the dimple 26. In this sense, the dimple 26 may be a convex region on the plate 16. In further embodiments, the dimple 26 is a concave region on the plate 16.

As mentioned above with reference to FIGS. 5-9, when the bend on the plate 16 is formed, the plate 16 may emit an audible sound. For example, when the plate 16 is being bent, the dimple 26 may be flexed, such that the dimple 26 quickly changes shape from a convex to a concave region (or vice-versa), such that the dimple 26 emits the audible sound during such rapid change in shape.

In some embodiments and as shown with FIG. 11, the dimple 26 may extend upwards from the surface of the plate 16. For example, the plate 16 may include an upper face 74, and as shown with particular reference to FIG. 11, the dimple 26 may extend from the upper face 74. Thus, the dimple 26 may extend towards the first panel 12 prior to being flexed. In other embodiments, the dimple 26 extends downwards from the surface of the plate 16. For example, as shown with particular reference to FIG. 11, the plate 16 may include a lower face 82. In such alternative embodiments, the dimple 26 may extend from the lower face 82. Thus, the dimple 26 may alternatively extend towards the second panel 14 prior to being flexed.

Of course, following the bending of the plate 16 to the point at which the dimple 26 causes the emission of the auditory sound, the plate 16 may still retain an appropriate elastic force to bias the plate 16 back towards its initial straight arrangement (thus pressing against the bar 28 and pressing the first and second panels 12, 14 apart). While the plate 16 is returning to its initial straight configuration, the dimple 26 may make a similar rapid change in shape. Accordingly, during use, as the apparatus 10 is cycled between the aforementioned "open" and "closed" configurations, the plate 16 may provide two distinct auditory emissions. While generally discussed herein as a "dimple," it should be appreciated that the plate 16 may include any appropriate contours or features for releasing an auditory sound in response to the plate 16 being bent.

Figure 12:
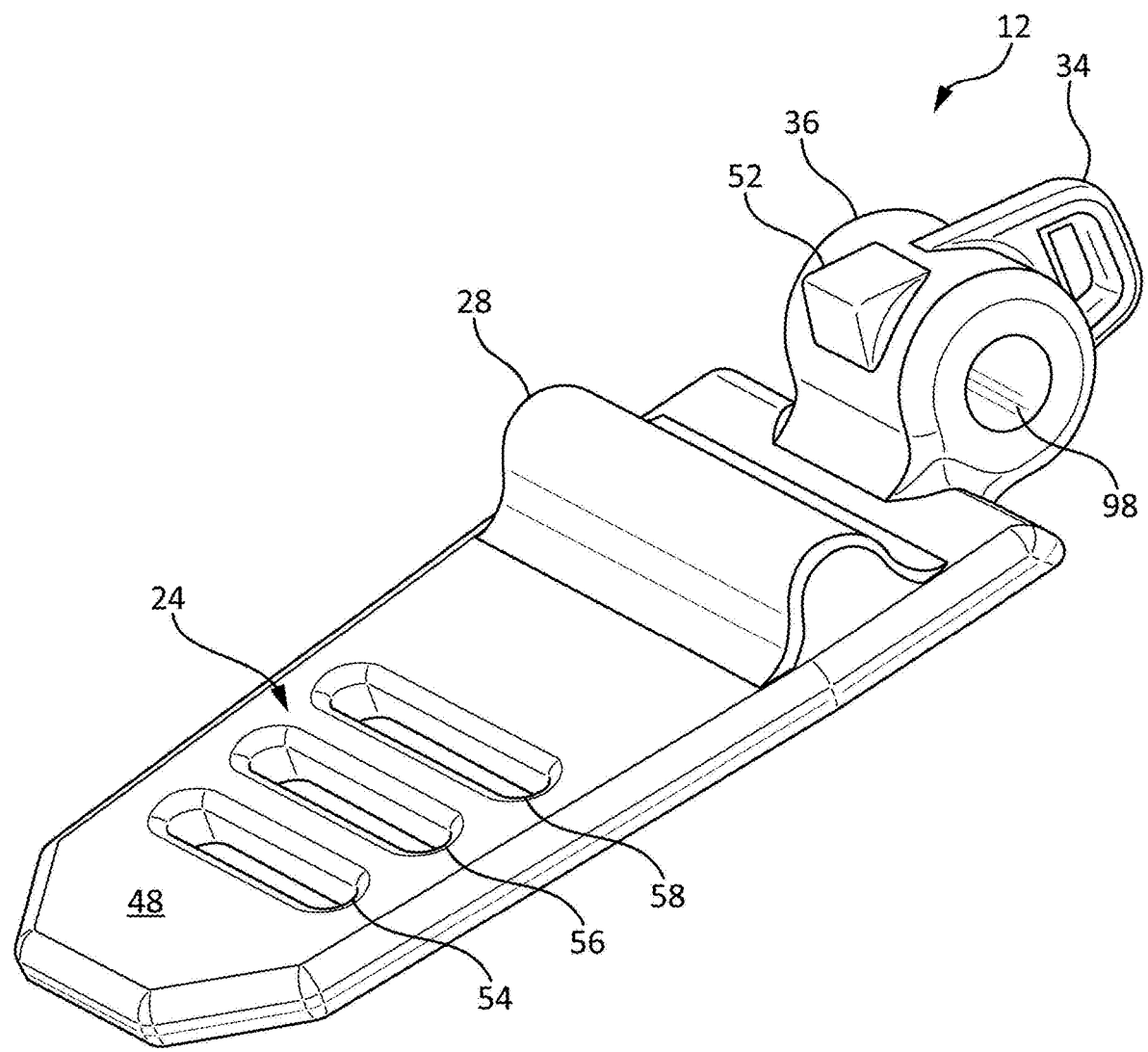
FIG. 12 is a lower perspective schematic view of a first panel for an animal training apparatus, according to some embodiments of the present disclosure.
Figure 13:
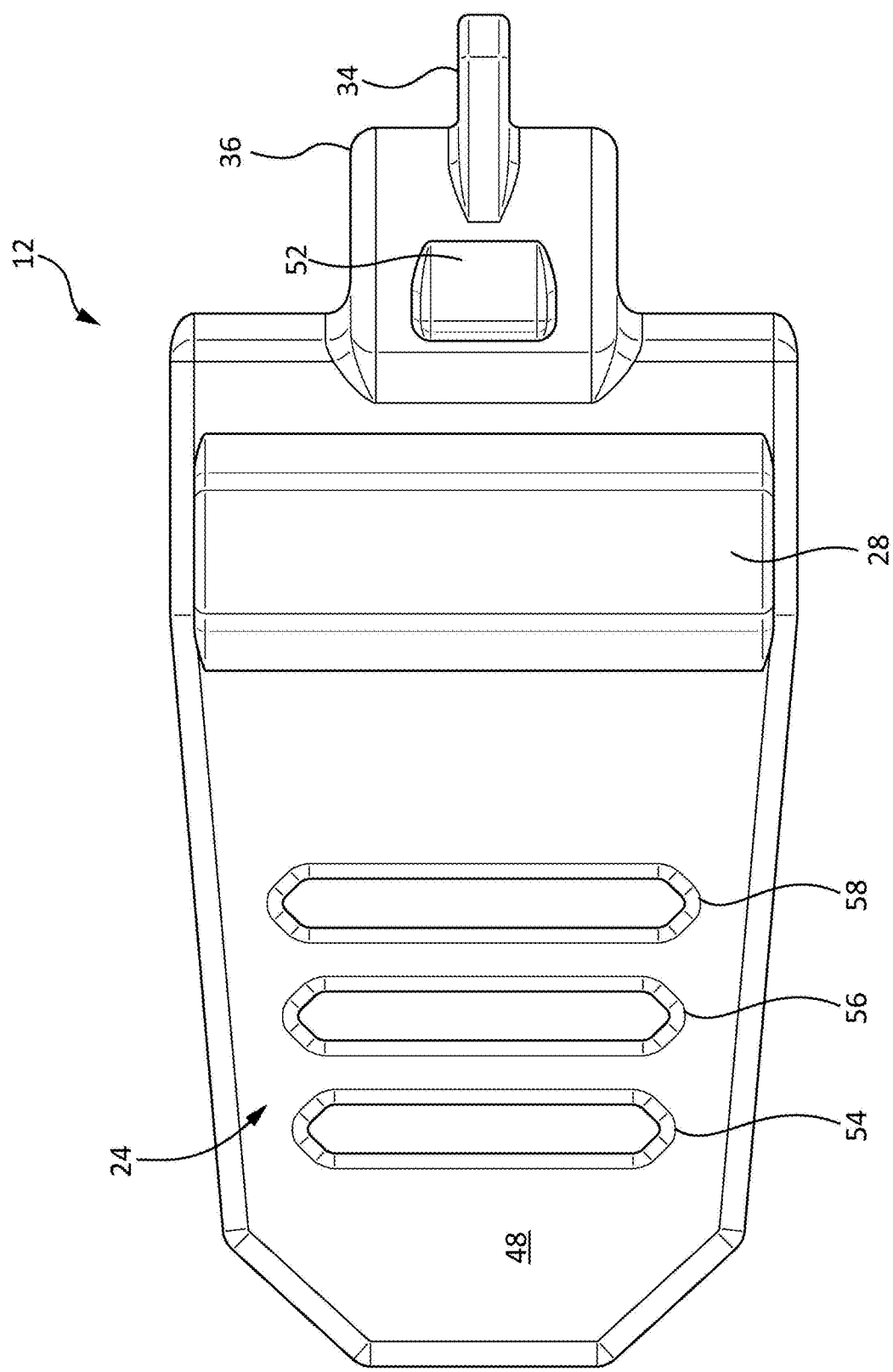
FIG. 13 is a bottom schematic view of a first panel for an animal training apparatus, according to some embodiments of the present disclosure.
Figure 14:
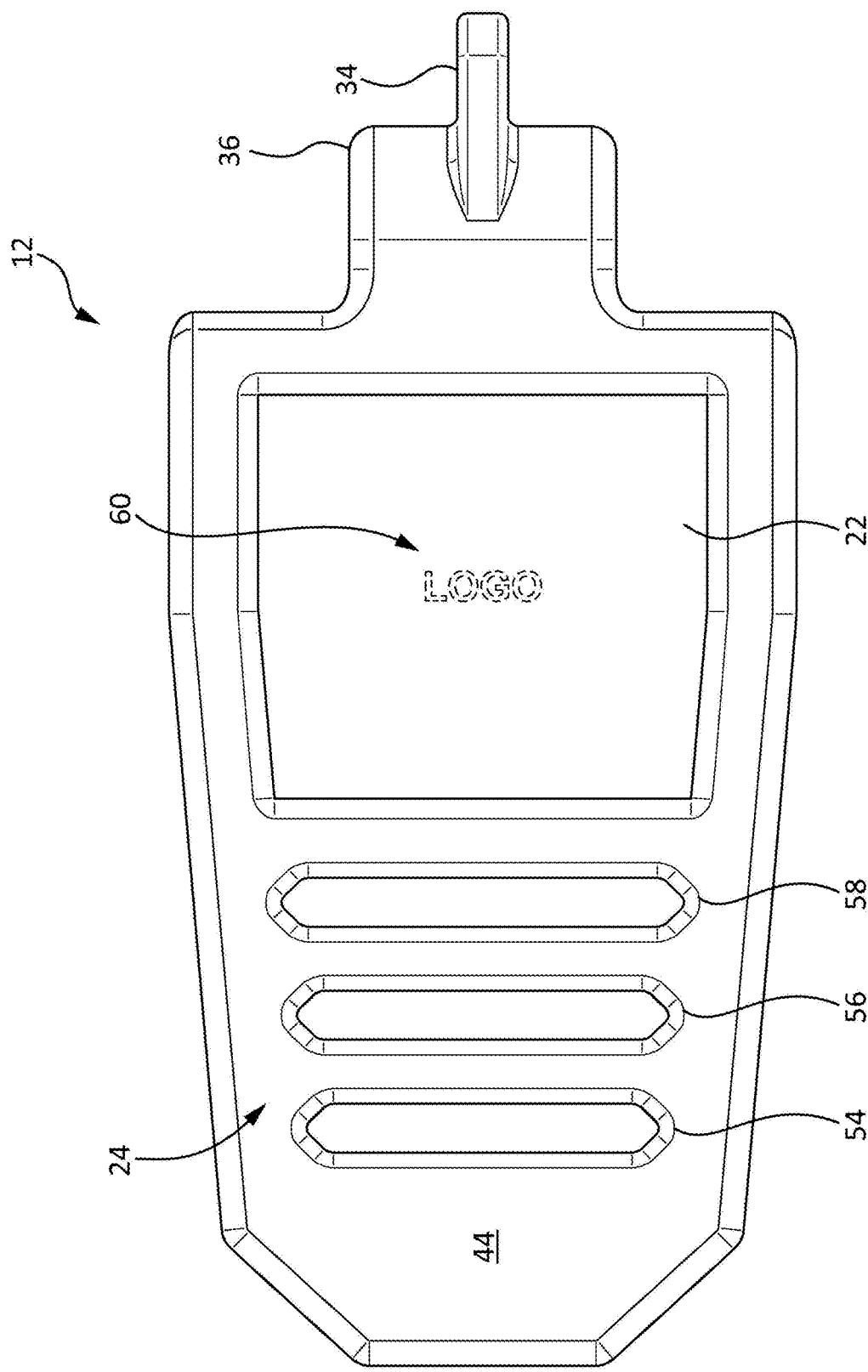
FIG. 14 is a top schematic view of a first panel for an animal training apparatus, according to some embodiments of the present disclosure.

Referring now to FIGS. 12-14, the first panel 12 is shown in greater detail, according to various embodiments of the present disclosure. In some embodiments, the first panel 12 includes one or more slots 24 extending through the first panel 12. For example, the one or more slots 24 may include three such slots: a first slot 54, a second slot 56, and a third slot 58. As mentioned above with reference to FIGS. 5-9, a bend on the plate 16 may be formed, such that the plate 16 emits an audible sound. Advantageously, the slot(s) 24 may allow for an enhanced amount of such audible sound to be emitted through the first panel 12 (e.g., without being captured against the inner surface of the first panel 12). In further embodiments, the slots 24 provide enhanced grip of the device during use.

As discussed in greater detail below, the first panel may 12 include a hinge component 36 extending from a rear end of the first panel 12. The hinge component 36 may form a part of the hinge 18 depicted with reference to FIG. 1. In some embodiments, the first panel 12 further includes a mechanical stop 52 protruding from the hinge component 36. As discussed in greater detail below with reference to FIG. 18, the mechanical stop 52 may limit the amount that the first panel 12 may be pivoted away from the second panel 14.

As shown with particular reference to FIG. 14, the outer face 48 of the first panel 12 may feature a depression 22. For example, the depression 22 may be a recessed region below the surface of the outer face 48. In some embodiments, a logo or other identifying feature may be implemented on the depression 22. Thus, the depression 22 may be provided as an indicia plate, a name plate, a branding feature, or some other desirable identifier. Depending on the implementation, a logo 60 may be implemented on the surface of the depression 22. For example, the logo 60 may feature embossed text (e.g., raised lettering, a raised logo, etc.) that extends form the surface of the depression 22 in order to be coplanar with the outer face 48 of the first panel 12.

Figure 15:
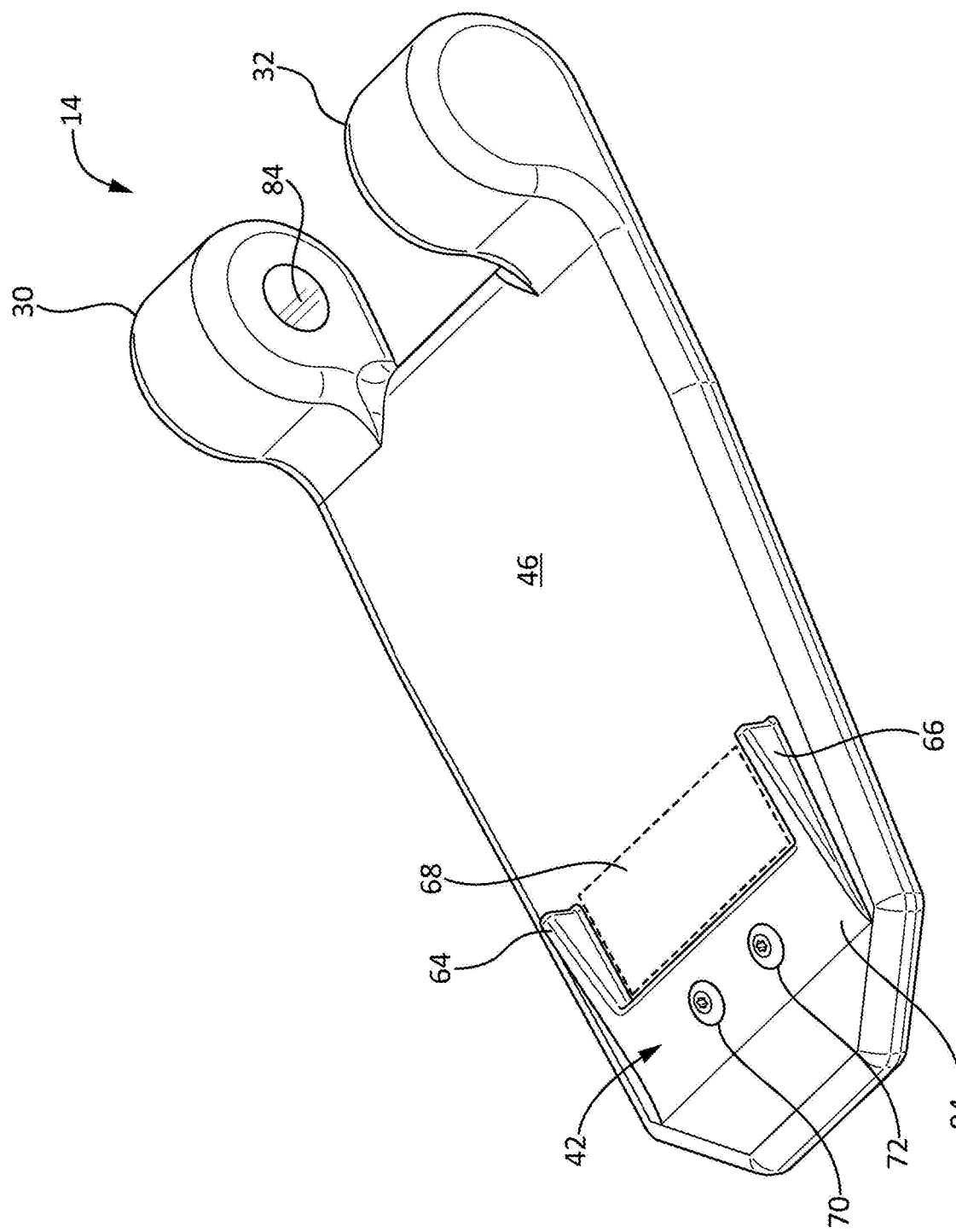
FIG. 15 is an upper-right perspective schematic view of a second panel for an animal training apparatus, according to some embodiments of the present disclosure.
Figure 16:
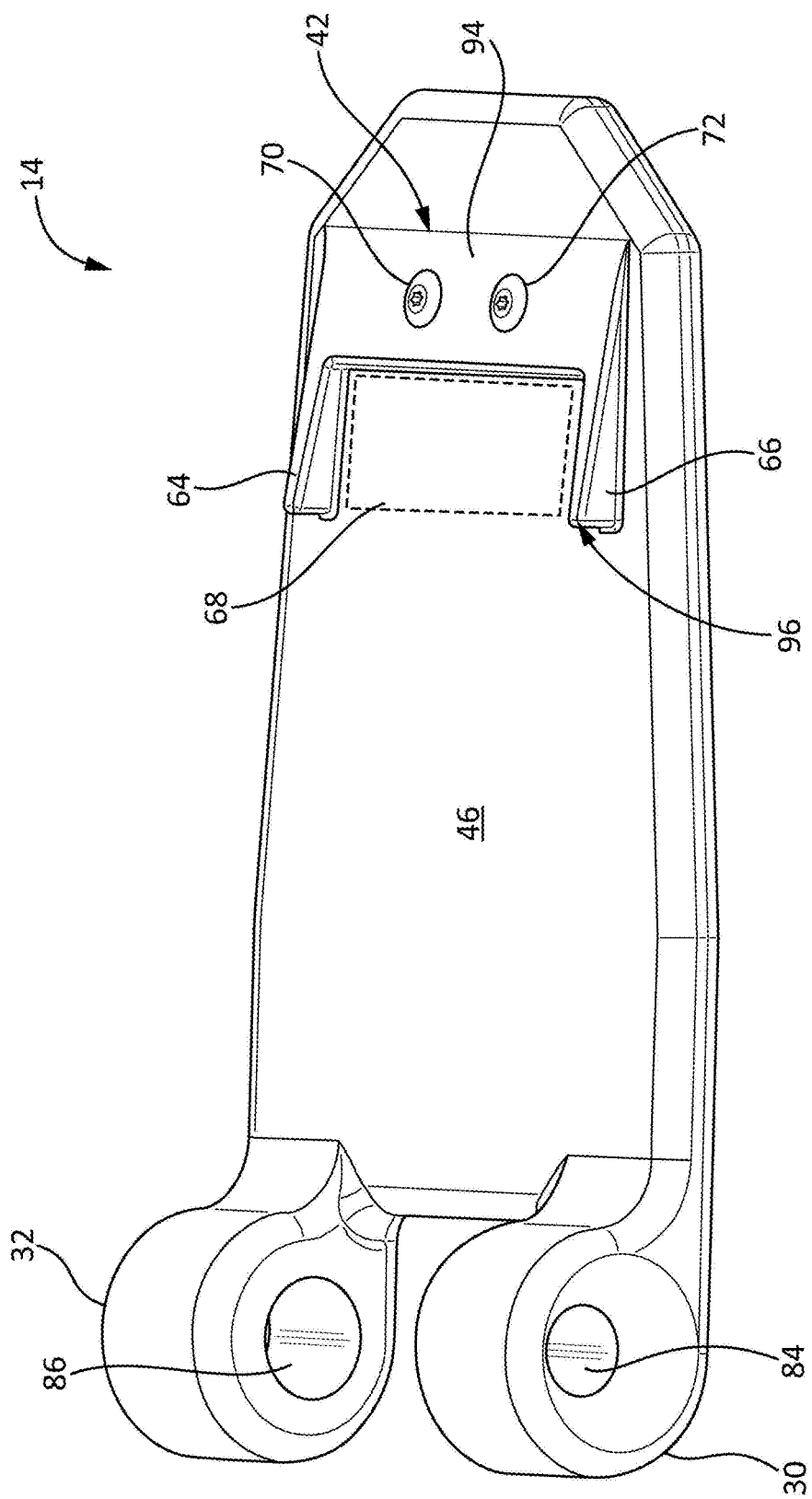
FIG. 16 is an upper-left perspective schematic view of a second panel for an animal training apparatus, according to some embodiments of the present disclosure.
Figure 17:
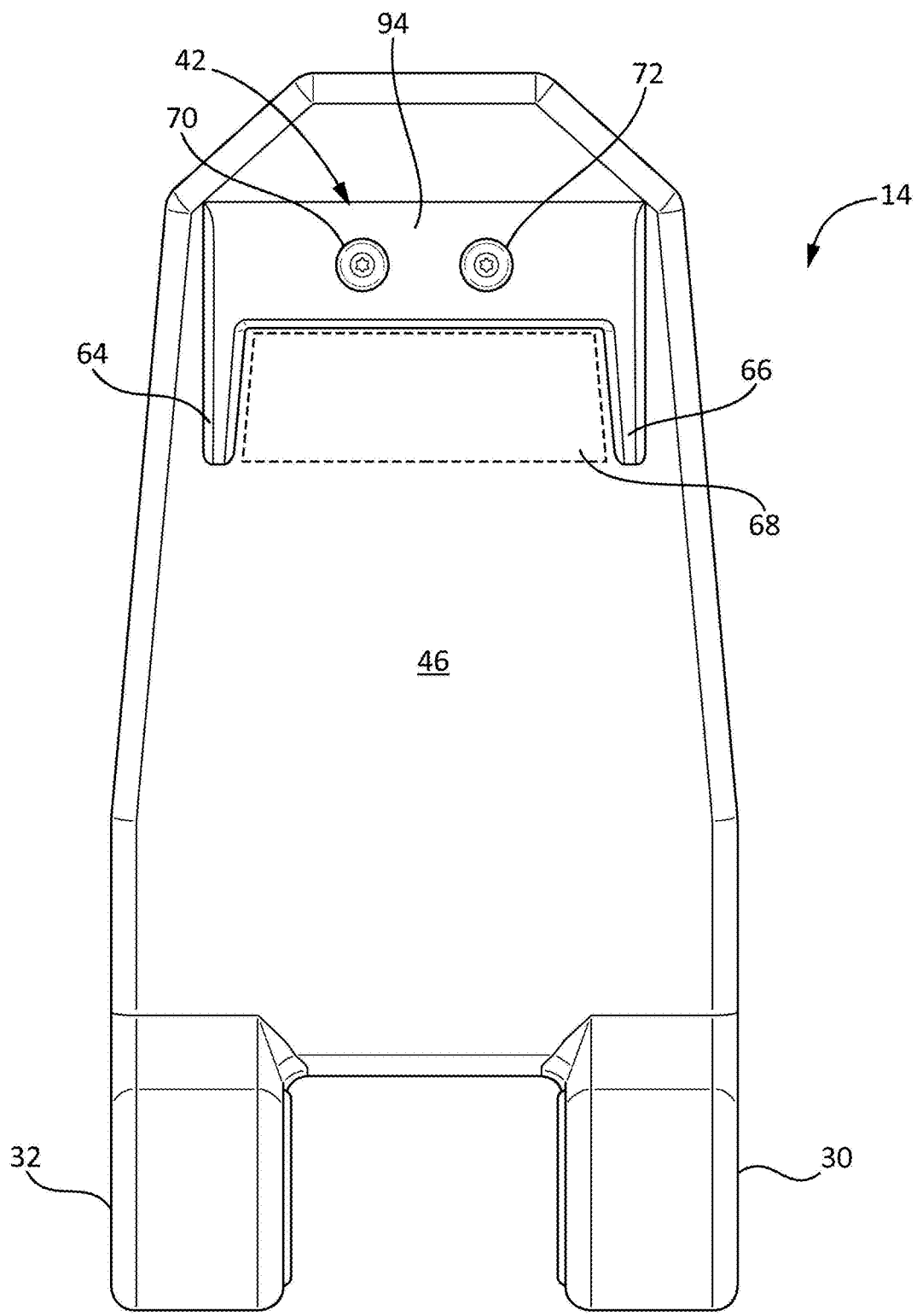
FIG. 17 is a top schematic view of a second panel for an animal training apparatus, according to some embodiments of the present disclosure.

Referring now to FIGS. 15-17, the second panel 14 is shown in greater detail, according to various embodiments of the present disclosure. In some embodiments, the second panel 14 includes a ramp 42 extending towards the first panel 12 (as shown with reference to FIG. 1). The ramp 42 may include a base 94 and a tip 96. Thus, the ramp 42 may extend toward the first panel 12 between the base 94 of the ramp 42 and the tip 96 of the ramp 42. In some embodiments, the ramp includes pair of arms 64, 66. For example, the pair of arms 64, 66 may extend from the base 94 along outer edges of the ramp 42 and towards the hinge 18. As depicted in greater detail with reference to FIG. 20, the fixed end 90 of the plate 16 may be secured to the ramp 42.

In some embodiments, a distal border of the base 94 of the ramp 42, along with the distal tips of the pair of arms 64, 66, define a recess 68. As shown with additional reference to FIG. 1, the plate 16 may be disposed on the base 42 and the pair of arms 64, 66, such that the recess 68 is formed between the plate 16 and the second panel 14, and between the pair of arms 64, 66.

As mentioned above with reference to FIGS. 5-9, when the first panel 12 is pivoted towards the second panel 14, the plate 16 may form a bend. In some embodiments, the bend formed on the plate 16 may be positioned in between the tip 96 of the ramp 42 and the bar 28 of the first panel 12. As mentioned above with reference to FIGS. 10 and 11, the plate 16 may include the dimple 26. In embodiments where the plate 16 includes the dimple 26, the dimple 26 may be positioned over the tip 96 of the ramp 42. In other words, the dimple 26 may be positioned between the pair of arms 64, 66. In this sense, the tip 96 of the ramp 42 (including the outer pair of arms 64, 66 and the recess 68 formed therebetween) may enhance an amount of force imparted upon the dimple 26 when the plate 16 is bent as discussed herein. Advantageously, this may facilitate a decreased amount of user force being required to produce the auditory emissions from the plate 16, less bending being required to produce the auditory emission, a greater amount of sound produced by the auditory emission, and other related enhancements.

Figure 18:
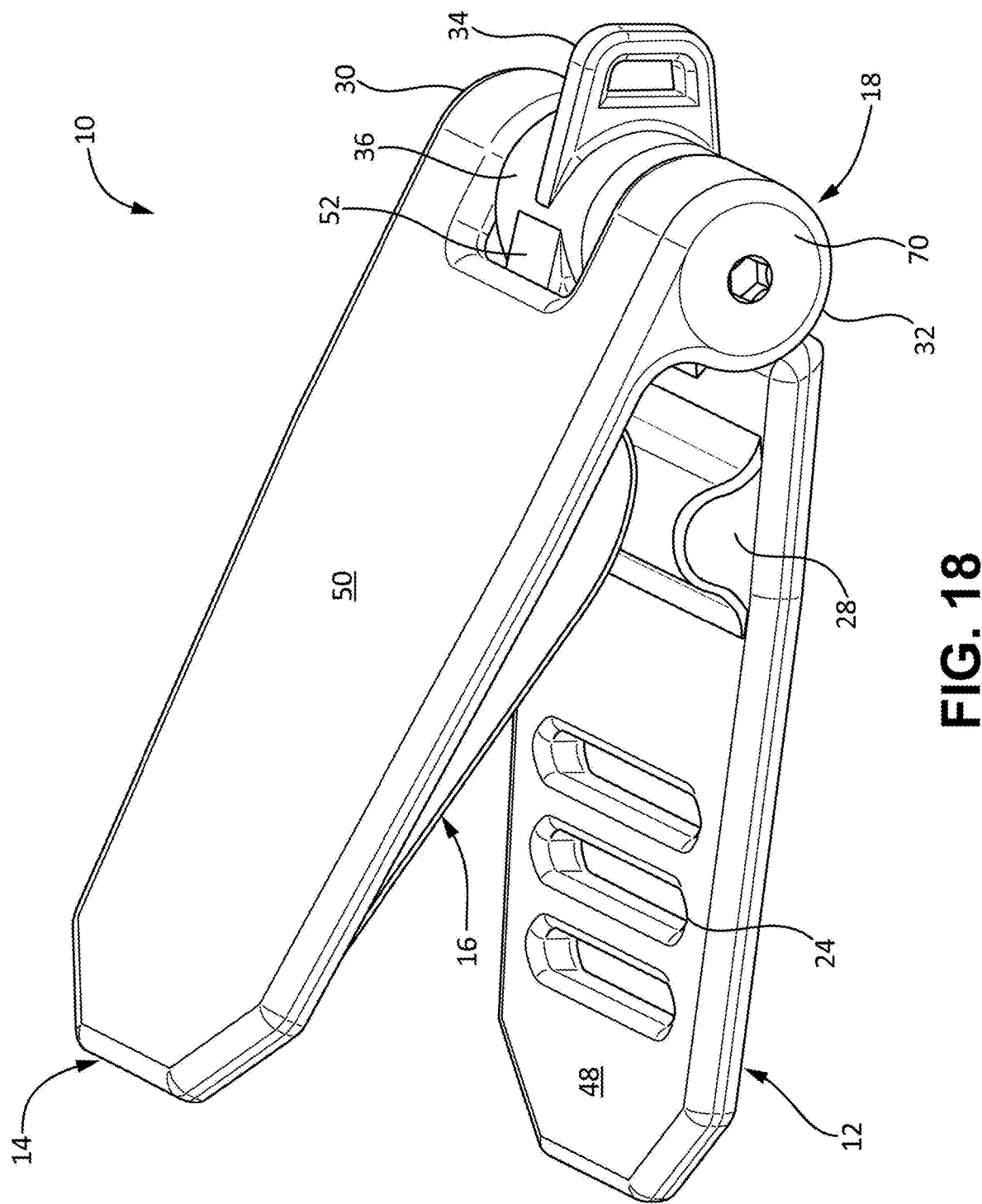
FIG. 18 is a lower perspective schematic view of an animal training apparatus, according to some embodiments of the present disclosure.

Referring now to FIG. 18, the mechanical stop 52 of the first panel 12 is discussed in greater detail, according to some embodiments of the present disclosure. As mentioned above, the first panel may 12 include the hinge component 36 extending from the rear end of the first panel 12, and the In some embodiments, the first panel 12 may include the mechanical stop 52 protruding from the hinge component 36. As suggested above, the mechanical stop 52 may limit the amount that the first panel 12 may be pivoted away from the second panel 14. For instance, as shown with reference to FIG. 18, the first panel 12 may be pivoted away from the panel 14 until the second panel 14 makes contact with the mechanical stop 52, thus preventing the first and second panels 12, 14 from being further pivoted apart. Advantageously, the mechanical stop 52 may facilitate the apparatus 10 retaining a compact shape when not in use, and further prevent the plate 16 from being overly exposed to inadvertent contacts that may damage the plate 16.

Figure 19:
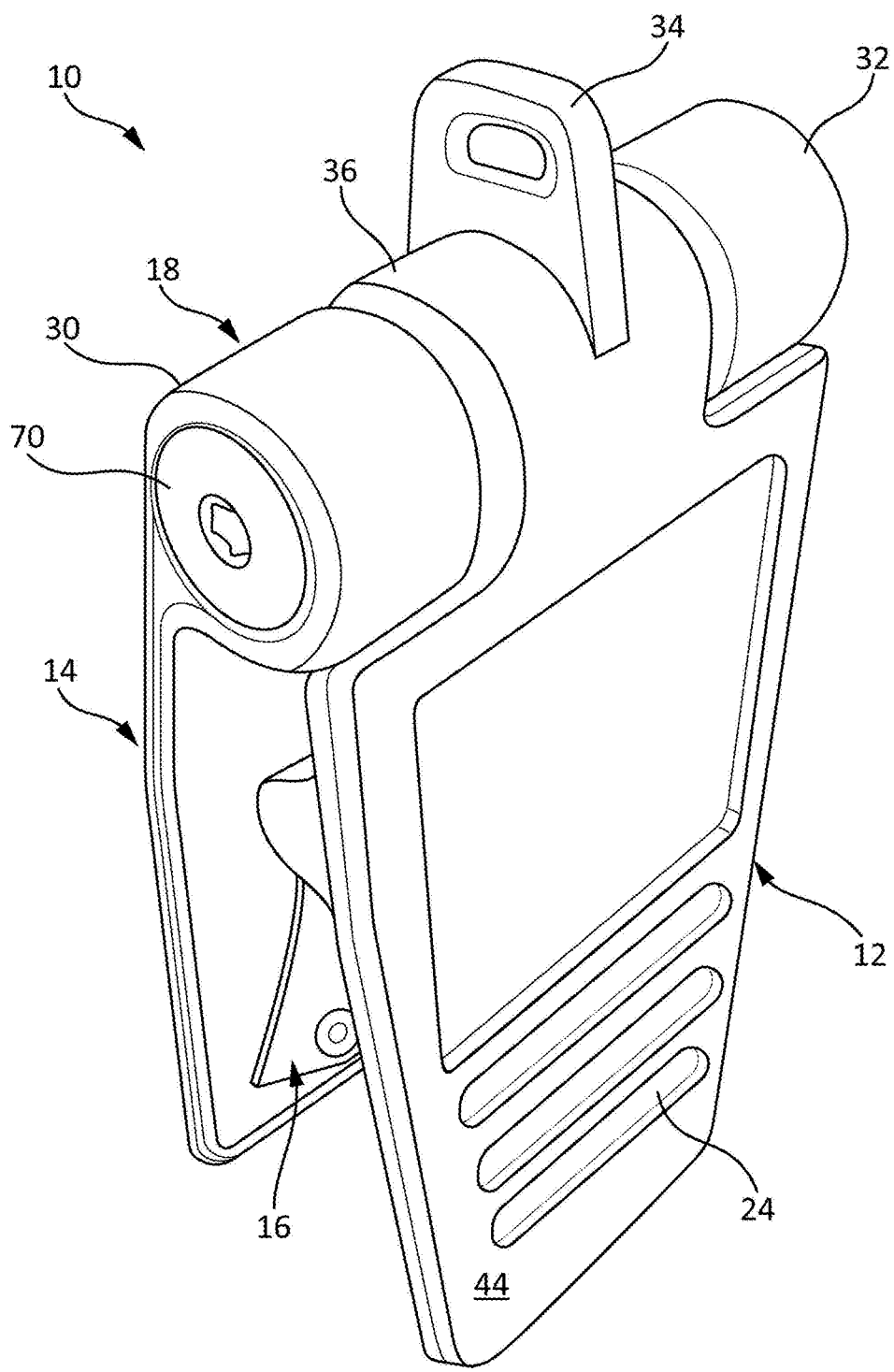
FIG. 19 is an inverted perspective view of an exemplary implementation of an animal training apparatus, according to some embodiments of the present disclosure.
Figure 20:
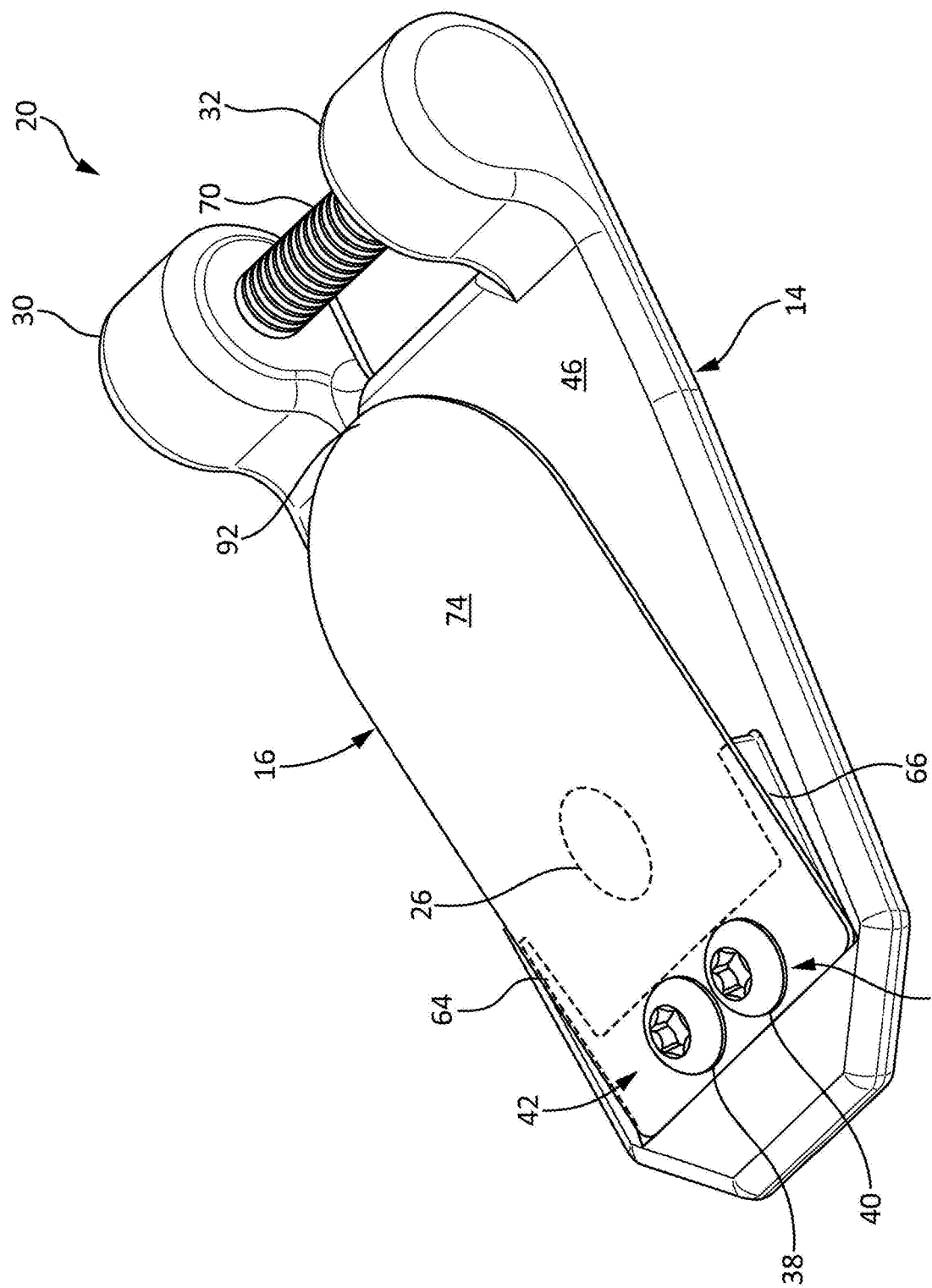
FIG. 20 is an upper-right perspective schematic view of a second panel, pin, and plate for an animal training apparatus, according to some embodiments of the present disclosure.

Referring now to FIGS. 18-20, with additional reference to FIGS. 5, 12, 15, and 16, the hinge 18 as discussed in greater detail, according to various embodiments of the present disclosure. As mentioned above with reference to FIGS. 12-14, and as shown with reference to FIG. 12, the first panel may 12 include the hinge component 36 extending from a rear end of the first panel 12. The hinge component 36 may form a portion of the hinge 18 depicted with reference to FIG. 1.

As shown with reference to FIG. 15, the second panel 14 may include corresponding hinge components 30, 32. Thus, when the apparatus 10 is assembled as shown with reference to FIG. 1, the hinge components 30, 32 of the second panel 14 may be positioned outside of the hinge component 36 of the first panel 12. Accordingly, the first panel 12 may include the single central hinge component 36 positioned within the pair of outer hinge components 30, 32 of the second panel 14. In further embodiments, the hinge 18 is formed by other arrangements of hinge components. As a first example, the second panel 14 may include a single hinge component, while the first panel 12 may include a pair of hinge components positioned on either end of the single hinge component of the first panel 12. As a second example, the first and second panels 12, 14 may each include a single hinge component.

In some embodiments, the hinge 18 includes a pin 70. The pin 70 may extend through the hinge components 30, 32, 36, such that the first panel 12 may pivot about the pin 70, and thus pivot about the second panel 14. For example, as shown with reference to FIGS. 15 and 16, the hinge component 30 of the second panel 14 may include a hole 84 and the hinge component 32 of the second panel 14 may include a hole 86 aligned with the hole 84. Likewise, and as shown with reference to FIG. 12, the hinge component 36 of the first panel 12 may include a hole 98 aligned with the holes 84, 86 when the hinge 18 is assembled as shown with reference to FIG. 1.

As shown with particular reference to FIGS. 18-20, the pin 70 may be a screw or bolt. For example, the pin 70 may feature a threaded shaft (as shown with reference to FIG. 20). In some embodiments, the hole 84 of the hinge component 30 on the second panel 14 may feature a beveled rim to receive a head of the pin 70. Depending on the implementation, one or more of the holes 84, 86, 98 may feature corresponding threading, such that the pin 70 is secured relative to the hinge 18.

As a first example, the hole 98 of the hinge component 36 on the first panel 12 may feature corresponding threading, such that the pin 70 may be threaded through the hole 98 until the head of the pin 70 becomes loosely seated within the beveled rim of the hole 84. In turn, threading of the pin 70 may become engaged with the threading of the hole 98, and the holes 84, 86 of the second panel 14 may provide clearance such that the hinge components 30, 32 of the second panel 14 may rotate freely about the pin 70, such that the first panel 12 is pivotable about the second panel 14.

As a second example, the hole 86 of the hinge component 32 on the second panel 14 may feature such corresponding threading. In this sense, the pin 70 may be inserted thought the hole 84 on the hinge component 30 on the second panel 14, though the hole 98 of the hinge component 36 on the first panel 12, and the pin 70 may be threaded through the hole 86 of the hinge component 32 on the second panel 14 until the head of the pin 70 becomes seated within the beveled rim of the hole 84. Thus, the pin 70 may be fixed relative to the second panel 14, while the hole 98 provides clearance for the pin 70, such that the hinge component 36 of the first panel 12 (and thus the first panel 12) may be free to rotate about the pin 70. In further embodiments, some other appropriate arrangement of threading is used. In any case, the pin 70 may advantageously be removed, such that the first panel 12 may be disassembled from the second panel 14.

As mentioned above with reference to FIGS. 5-9, the apparatus 10 may include the loop 34 disposed on the hinge 18. For example, the loop 34 may be disposed on and extend from the hinge component 36 of the first panel 12.

Referring further to FIG. 20, the plate 16 is shown assembled to the second panel 14, according to some embodiments of the present disclosure. As mentioned above with reference to FIGS. 15-17, and as shown in additional detail with reference to FIG. 8, the fixed end 90 of the plate 16 may be secured to the ramp 42. For example, the apparatus 10 may include fasteners 62 configured to secure the plate 16 to the ramp 42. In some embodiments, the fasteners 62 may include mechanical fasteners such as a first screw 38 and a second screw 40. As shown with reference to FIG. 10, the plate 16 may include corresponding attachment holes 78, 80 configured to receive the first and second screws 38, 40. As shown with reference to FIG. 17, the base 94 of the ramp 42 may include corresponding base holes 70, 72 configured to receive the first and second screws 38, 40. For example, the base holes 70, 72 may feature threading corresponding to threading of the first and second screws 38, 40, such that the first and second screws 38, 40 may be passed though the attachment holes 78, 80 of the plate 16 and seated within the base holes 70, 72, such that the free end 90 of the plate 16 is secured (e.g., "sandwiched") between the base 94 of the ramp 42 and the heads of the first and second screws 38, 40.

As discussed herein, the present disclosure further provides for a method of emitting an animal training noise. The method may include providing the first panel 12, the second panel 14, and the plate 16 as discussed above. As shown with particular reference to FIGS. 8 and 9, the method may further include pivoting the first panel 12 towards the second panel 14, such that the free end 92 of the plate 16 makes contact with the bar 28 and the plate 16 is bent. As discussed above with reference to FIGS. 5-9, when the plate 16 is bent, the plate 16 may emit an audible sound.

Thus, although there have been described particular embodiments of a new and useful ANIMAL TRAINING APPARATUS, it is not intended that such references be construed as limitations upon the scope of this invention except as set forth in the following claims.

What is claimed is:

1. An animal training apparatus, the apparatus comprising:
    a first panel;
    a second panel pivotally connected to the first panel at a hinge; and
    a plate including a fixed end disposed on the second panel, a free end extending towards the first panel and the hinge, and a dimple positioned between the fixed end and the free end,
    wherein the first panel includes a bar extending towards the second panel,
    wherein when the first panel is pivoted towards the second panel, the free end of the plate makes contact with the bar, such that the plate is bent, and
    wherein when the plate is being bent, the dimple is flexed, such that the dimple emits an audible sound.

2. The apparatus of claim 1, wherein the second panel includes a ramp extending towards the first panel from a base of the ramp to a tip of the ramp,
    wherein the ramp includes a base and a pair of arms extending from the base along outer edges of the ramp and towards the hinge, and
    wherein the plate is disposed on the base and the pair of arms, such that a recess is formed between the plate and the second panel, and between the pair of arms.

3. The apparatus of claim 2, wherein the dimple is positioned over the tip of the ramp.

4. The apparatus of claim 2, wherein the bar is wider than the plate.

5. The apparatus of claim 1, further comprising a loop disposed on the hinge.

6. The apparatus of claim 3, wherein the dimple extends towards the first plate prior to being flexed.

7. The apparatus of claim 3, wherein the dimple extends towards the second panel prior to being flexed.

8. The apparatus of claim 3, wherein the first panel includes one or more slots extending through the first panel.

9. The apparatus of claim 3, wherein a cross-wise through-hole is formed between the bar and the hinge.

10. An animal training apparatus, the apparatus comprising:
    a first panel;
    a second panel pivotally connected to the first panel forming a hinge; and
    a plate including a fixed end disposed on the second panel, and a free end extending towards the first panel and the hinge,
    wherein the first panel includes a bar extending towards the second panel,
    wherein the second panel includes a ramp extending towards the first panel between a base of the ramp and a tip of the ramp,
    wherein when the first panel is pivoted towards the second panel, the free end of the plate makes contact with the bar, such that a bend is formed on the plate between the tip of the ramp and the bar, and
    wherein when the bend on the plate is formed, the plate emits an audible sound.

11. The apparatus of claim 10, wherein the ramp includes a base and a pair of arms extending from the base along outer edges of the ramp and towards the hinge, and
    wherein the plate is disposed on the base and the pair of arms, such that a recess is formed between the plate and the second panel, and between the pair of arms.

12. The apparatus of claim 10, wherein the bar is wider than the plate.

13. The apparatus of claim 10, wherein the first panel includes one or more slots extending through the first panel.

\* \* \* \* \*